United States Patent Office

Re. 26,054
Reissued July 5, 1966

26,054
MEAT CURING PROCESS AND COMPOSITION THEREFOR

Thomas William Humphreys, London, Ontario, Canada, and David F. Hinkley, Plainfield, N.J., assignors to Merck & Co., Inc., Rahway, N.J., a corporation of New Jersey No Drawing. Original No. 3,201,263, dated Aug. 17, 1965, Ser. No. 273,553, Apr. 17, 1963. Application for reissue Dec. 17, 1965, Ser. No. 517,167
10 Claims. (Cl. 99—222)

Matter enclosed in heavy brackets [ ] appears in the original patent but forms no part of this reissue specification; matter printed in italics indicates the additions made by reissue.

This invention relates to an improved method of curing meat and, more particularly, to an economical method for accelerating the curing of meat and to compositions useful in meat curing.

Originally, one of the main purposes of curing meat was to preserve the meat without refrigeration. The so-called curing process consisted essentially of the addition of salt. Later it was found that by the addition of various agents the flavor and color of the meat could be substantially enhanced. It was also found that the use of other agents, notably ascorbic acid, its isomers and salts, accelerated and stabilized the curing of meat so that the time involved in the curing process could be substantially reduced, resulting in faster and more carefully controlled curing cycles.

In the processing of meat today it is now a common practice to employ curing salt compositions which include sodium chloride, an alkali metal nitrite and/or nitrate along with ascorbic or isoascorbic acid. If desired, sugar in the form of cane, beet, or corn sugar may also be added to the medium, which in addition to enhancing the flavor is also of importance in producing a desirable curing medium. Phosphate in the form of sodium tripolyphosphate, sodium metaphosphate and trisodiumphosphate may also be added to the curing medium in varying amounts in accordance with methods previously described in the prior art. Other agents such as spices and various seasonings are also commonly employed in the curing process. In general, therefore, it might be said that ordinarily the main ingredients employed in the curing of meat are sodium nitrate, sodium nitrite, sugar and ascorbic acid or an isomer, salt or ester thereof.

It will be observed from the foregoing that, of the principal additives employed in the curing of meat, ascorbic acid or one of its isomers is the most expensive of the ingredients utilized.

It is an object of this invention to provide a method for the curing of meat which is substantially reduced in cost when compared with the presently-employed salt ascorbate mediums.

It is a further object to provide such a low-cost medium which, however, will function in such a way that a rapid, carefully-controlled curing reaction will be effected.

A still further object of the present invention is to provide curing mediums and a method of curing meat which will result in the development of a desirable cure color in the meat which is stable under exposure to fluorescent light for long periods of time.

In accordance with one embodiment of our invention, it has been found that it is possible to effect a rapid and carefully-controlled cure of meat by employing a curing medium which, in addition to a source of nitric oxide, includes a small amount of 1,2,3-cyclohexanetrione. One of the desirable features of this particular compound used as a curing agent is that a rapid cure of the meat may be obtained by using unusually small amounts of the compound in the curing medium. Also, since it is chemically compatible with ascorbate salts, it may desirably be included as an additional ingredient in a conventional ascorbate curing medium.

In accordance with a further embodiment of our invention, it has been found that when amounts of at least 0.01% of 1,2,3-cyclohexanetrione, based on the weight of the meat, are incorporated into the curing medium, the characteristic pink-red color of the cured meat is stabilized against fading to a brown color when the meat is exposed to fluorescent light for a relatively long period of time.

In accordance with a further embodiment of our invention, it has been found that 1,2,3-cyclohexanetrione can be employed with particular advantage as a component of a so-called "pickling solution," i.e., a water solution of salt, sodium nitrite sucrose and other curing agents. In such a method it is desirable to maintain the pH of the pickling medium at between about 5 and about 8.5 in order that the curing reaction will take place efficiently. Although the pickling solution may be merely a solution of the desired ingredients in which the meat may be soaked, a more desirable practice in the rapid curing of meat is to employ a so-called "pumping pickle" or "injection pickle," thus shortening the time necessary to effect complete curing of the piece of meat to be cured.

This medium is particularly desirable for the curing of primal cuts of meat such as hams, loins and the like. The meat to be cured may be allowed to soak in the pickle solution or, if a more rapid cure is desired, the pickling solution may be injected into the meat to permit a more rapid diffusion of the curing agent throughout the tissue.

Pursuant to a still further method of carrying out the process of our invention, comminuted meat of the type used in preparing commercial sausages, such as frankfurters, is mixed with a curing salt mixture containing sodium chloride, sodium nitrite and a small amount of 1,2,3-cyclohexanetrione. The amounts of salts and additives which are included in the dry salt curing mixture should be so adjusted that an aqueous solution of the curing mixture has a pH of from about 5 to about 8.5.

According to one further embodiment of our invention, there are provided dry homogeneous compositions including a small amount of 1,2,3-cyclohexanetrione and a diluting edible carrier composition which contains no nitrite curing salt. These compositions may be used in fresh meat processing as well as in cured meat processing. It is desirable to have such compositions available for the nitrite curing of meat in view of the fact that compositions containing both nitrite salts and 1,2,3-cyclohexanetrione are subject to deterioration when stored for long periods under variable conditions of temperature.

Such compositions include sodium chloride which may take the place of, or supplement, the sodium chloride contained in a nitric-oxide producing curing composition. In such curing compositions containing sodium chloride and a small amount, e.g. at least about 0.1% of 1,2,3-cyclohexanetrione there are also included a variety of binders, fillers, seasoning and flavoring agents such as sugars, spices in the form of oils or oleoresins or as ground spice. These dry curing compositions may also contain other edible ingredients such as flours, starches, corn sugar, cane sugar, casein, dry powdered milk, and gelatin. Compositions of this type may be prepared for distribution and use in the curing of meat, along with added alkali metal nitrates and/or nitrites and additional sodium chloride, if desired. The amount of the composition which is added along with the nitrite salt mixture is adjusted so that there is provided from .001% to about .05% of 1,2,3-cyclohexanetrione based on the weight of the meat.

The curing mixtures utilized in the process of our invention may be employed conveniently in the preparation of other types of special meat products. For example, pork bellies may be cured for bacon by the use of a dry salt mixture containing at least 0.001% 1,2,3-cyclohexanetrione. In addition, various cured meat products which may be produced in accordance with the present invention are frankfurters, Vienna sausage, Bologna, cured meat loaves, salami, chopped ham, and such cured meat products as these which are manufactured from an emulsion of meat and water, and the like.

In addition to the accelerated curing action obtained by employing a small amount of 1,2,3-cyclohexanetrione as a component of a nitric oxide-containing curing medium, other important advantages are gained by the use of this material. Outstanding among these advantages is the unusual color stability conferred on the cured meat product as compared with the prior art cured meat products when exposed for long periods of time to the action of fluorescent light.

In accordance with our invention, we have found that 1,2,3-cyclohexanetrione can be added to other curing agents in an amount which is dependent on the method of cure used, the material which is being cured, the acceleration of cure desired, or the need to maintain the cure color for prolonged periods of time on exposure of the cured meat to fluorescent light. The amount of 1,2,3-cyclohexanetrione which is added to the curing mixture varies with the curing reaction and is partly dependent on the amount of cure acceleration required and on the desirability for having unusual color stability conferred on the cured meat. The exact amount must be determined, in most cases, experimentally, and is dependent upon the specific curing medium selected. In most cases it has been found that adding 1,2,3-cyclohexanetrione in an amount of at least 0.001%, based on the weight of the meat, results in a rapid, accelerated cure. Amounts used in excess of about 0.02% of 1,2,3-cyclohexanetrione, based on the weight of the meat, when employed as a curing agent in combination with a nitric oxide producing medium, result in the production of a cured meat product having a desirable pink-red cure color which is stable and does not fade for long periods of time on exposure to fluorescent light.

It has been found generally satisfactory when a stabilized cure color is desired to employ amounts of 1,2,3-cyclohexanetrione ranging from about 0.02% to about 0.05%, based on the weight of the meat. Amounts in excess of 0.05% up to about 0.2% can be used, if desired, but it is believed that amounts in excess of about 0.05% are unnecessary and, thus, uneconomical in the meat curing process. If color stability under exposure to fluorescent light in the cured meat is not a necessary feature of the desired product, smaller amounts of the curing agent than 0.02% may be employed in the curing reaction. However, at least an amount of about 0.001%, based on the weight of the meat, should be employed in order to provide a curing medium which will effect an accelerated and rapid cure when employing a nitric oxide curing medium.

In the examples which follow, the cure color of the meat was visually inspected and given a relative intensity of cure color rating based on comparison with a standard sample of cured meat, ranging from 0 (which represents complete loss of red cure color) to a value of 6 (a pinky-red full cure color). The examples which follow are intended to be merely illustrative of some of the specific embodiments of our invention, the limits of which are defined in the appended claims.

EXAMPLE 1

The curing of chopped meat with 1,2,3-cyclohexanetrione

Experimental sausage is prepared from fresh ground meat comprising 60% beef chucks and 40% pork trimmings in admixture with curing agents according to the following formula:

| | |
|---|---|
| Meat | 100 gm. |
| Sodium nitrite | 1.0 ml. of 1% stock solution. |
| Sodium chloride | 3.0 gm. |

Test agent dissolved in 5.0 ml. of distilled water.

The meat, salt and sodium nitrite are first mixed in a conventional type mixer, for example a Hobart Model N–50 mixer set at speed No. 2 in a chilled stainless steel bowl for approximately 2 minutes. The distilled water containing the test agent is then added and mixing is continued for approximately 1 minute. The percentage levels of the test agent, based on the weight of the meat used, are indicated in Table A below. The samples are packed into 150 ml. beakers, covered with aluminum foil, and maintained for approximately 20 minutes at 40° F., cooked in a water bath at 73° C. for about 45 minutes. During the time of cooking the rate of cure color developed is observer at intervals. As indicated above, full cure color is assigned a value of 6; complete loss of cure color, a value of 0. Intermediate values are assigned, depending upon the visually-estimated loss. The rapidly of development of cure color on addition of small amounts of 1,2,3-cyclohexanetrione, compared with the control sample containing no 1,2,3-cyclohexanetrione, is evident from the data in Table A.

TABLE A.—RATE OF COLOR DEVELOPMENT USING 1,2,3-CYCLOHEXANETRIONE

| Sample | Percent of Test Agent Added (by Weight of Meat) | Cure Color—Relative Intensity | | | |
|---|---|---|---|---|---|
| | | 4 min. | 8 min. | 16 min. | 28 min. |
| 1 | 0 | 0 | 0 | 1 | 2 |
| 2 | 0.001 | 1 | 1 | 3 | 6 |
| 3 | 0.005 | 1 | 1 | 4 | 6 |
| 4 | 0.01 | 1 | 1 | 6 | 6 |
| 5 | 0.034 | 1 | 3 | 6 | 6 |
| 6 | 0.05 | 1 | 3 | 6 | 6 |

EXAMPLE 2

Stability of cure color of meat cured with 1,2,3-cyclohexanetrione

The procedures of Example 1 are repeated, using the following amounts of 1,2,3-cyclohexanetrione based on the weight of the meat: 0.01, .034 and .50%. The cured meat is then cooled overnight at 40° F., cut into slices about ¼″ thick, wrapped in Saran, and exposed to fluorescent lighting of an intensity of 70 foot candles, and the rate of fading of the cure color observed. The results are recorded in Table B. It is clear from an inspection of the results recorded in Table B that amounts of 1,2,3-cyclohexanetrione in excess of about 0.02% confer an unusual color stability on the cured meat when exposed to high intensity of fluorescent light radiation for an extended period of time.

TABLE B.—CURE COLOR STABILITY UNDER FLUORESCENT ILLUMINATION

| Sample | Percent of Test Agent Added (by Weight of Meat) | Cure Color—Relative Intensity | | | |
|---|---|---|---|---|---|
| | | Initial | 2 hours | 4 hours | 6 hours |
| 1 | 0 (control sample). | 6 | 5 | 4 | 2 |
| 2 | .01 | 6 | 6 | 5 | 5 |
| 3 | .034 | 6 | 6 | 6 | 6 |
| 4 | .05 | 6 | 6 | 6 | 6 |

Longer periods of illumination of up to 14 hours result in complete retention of cure color in Samples 3 and 4 and complete loss of cure color in the control Sample No. 1. Additional testing confirms that samples containing as low as 0.02% 1,2,3-cyclohexanetrione have the same unusual cure color stability as Samples 3 and 4.

EXAMPLE 3

Use of 1,2,3-cyclohexanetrione in the pickling curing of pork

Fresh pork hams are injected with a pumping pickle and immersed in another covering pickle, and stored at refrigerator temperatures. The hams treated in this manner develop a desirable red color within a short period after treatment. Cutting of the meat shows that the red color is fairly well developed through most of the interior. When amounts of 1,2,3-cyclohexanetrione in excess of about 0.02% based on the weight of the meat are employed, slices of the meat, when exposed to fluorescent light for long periods of time, maintain their full red cure color. The injection pickle used has the following composition:

| | | |
|---|---|---|
| Salt | percent | 14.5 |
| Cane sugar | do | 3.0 |
| Sodium hexametaphosphate | do | 3.0 |
| Sodium nitrite (2 pounds per 100 gallons)[1] | do | 0.21 |
| Water | do | 79.3 |
| pH | | 6.8 |
| 1,2,3-cyclohexanetrione | percent | (0.009–.5) |

[1] Density of pickle solution is about 9.5 pounds/gallon.

The covering pickle used has the following approximate composition:

| | Percent |
|---|---|
| Sodium nitrite | 0.05 |
| Sodium nitrate | 0.08 |
| Sucrose | 1.5 |
| Sodium chloride | 15.0 |
| 1,2,3-cyclohexanetrione | .02 |

In each of the foregoing examples the test agent employed is 1,2,3-cyclohexanetrione in the form of its dihydrate.

What is claimed is:

1. A method of curing meat to accelerate the rate of curing and to stabilize the color of the cured meat which comprises contacting the meat with at least 0.001% by weight of the meat of 1,2,3-cyclohexanetrione and a nitric oxide-producing curing medium in a pH range of about 5.0 to about 8.5.

2. The method according to claim 1 wherein the amount of 1,2,3-cyclohexanetrione is from about 0.02% to about 0.05% based on the weight of the meat.

3. In the method of curing meat the improvement which comprises carrying out the curing reaction with a nitric acid-producing curing medium in a pH range of about 5.0 to about 8.5 containing at least 0.001 to 1,2,3-cyclohexanetrione based on the weight of the meat.

4. The improvement in the preparation of a cured sausage product manufactured from emulsion of meat and water which comprises incorporating into the meat emulsion along with the other ingredients of the curing medium at least 0.001% of 1,2,3-cyclohexanetrione based on the weight of the meat, said emulsion having a pH range of about 5.0 to about 8.5.

5. The improvement in the preparation of a cured sausage product according to the method of claim 4 wherein the amount of 1,2,3-cyclohexanetrione is from about 0.02% to about 0.05% based on the weight of the meat.

6. A meat curing preparation including sodium chloride, nitric oxide-producing medium and [ at least 0.001% by weight] *a sufficient amount* of 1,2,3-cyclohexane-trione [based on the weight of the meat], *to accelerate the meat cure and stabilize the cure color,* said meat curing preparation having a pH range of about 5.0 to about 8.5.

7. A solid curing salt composition for the curing of meat containing sodium chloride, at least one member selected from the group consisting of an alkali metal nitrite and an alkali metal nitrate and [at least 0.001% by weight] *a sufficient amount* of 1,2,3-cyclohexanetrione [based on the weight of the meat,] *to accelerate the meat cure and stabilize the cure color,* said solid curing salt composition having a pH range of about 5.0 to about 8.5.

8. A composition useful in treating meat and meat products which comprises a substantially dry homogeneous mixture containing [at least 0.001%] *a sufficient amount* of 1,2,3-cyclohexanetrione [based on the weight of the meat] *to accelerate the meat cure and stabilize the cure color* and, as substantially all the remainder, a diluting edible carrier composition therefor, said carrier composition being essential for the nitrite curing of meat and having a pH range of about 5.0 to about 8.5.

9. A meat pickling solution comprising an aqueous solution of [at least 0.001%] *a sufficient amount* of 1,2,3-cyclohexanetrione [based on the weight of the meat,] *to accelerate the meat cure and stabilize the cure color,* sodium nitrite, sodium chloride and sucrose, said meat pickling solution having a pH range of about 5.0 to about 8.5.

10. The improved method accelerating the rate of cure and of stabilizing of the cure color of meat which is being cured by the action of curing composition containing alkali nitrite, said method consisting of adding to said curing composition before use 1,2,3-cyclohexanetrione in an amount of at least 0.001% based on the weight of the meat, said curing composition having a pH range of about 5.0 to about 8.5.

References Cited by the Examiner

The following references, cited by the Examiner, are of record in the patented file of this patent on the original patent.

UNITED STATES PATENTS

| | | | |
|---|---|---|---|
| 1,635,301 | 7/1927 | Alsberg | 99—159 |
| 2,596,067 | 5/1952 | Brissey | 99—222 |
| 2,823,132 | 2/1958 | Sair | 99—159 |
| 2,828,212 | 3/1958 | Sair | 99—159 |
| 3,052,560 | 9/1962 | Delaney | 99—159 |

A. LOUIS MONACELL, *Primary Examiner.*

H. LORD, *Assistant Examiner.*